(12) United States Patent
Hunt et al.

(10) Patent No.: US 11,525,489 B1
(45) Date of Patent: Dec. 13, 2022

(54) AXIAL SWITCHABLE ONE WAY CLUTCH

(71) Applicant: Schaeffler Technologies AG & Co. KG, Herzogenaurach (DE)

(72) Inventors: Kenneth Hunt, Wooster, OH (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/573,583

(22) Filed: Jan. 11, 2022

(51) Int. Cl.
*F16D 41/12* (2006.01)
*F16D 41/16* (2006.01)

(52) U.S. Cl.
CPC ........... *F16D 41/125* (2013.01); *F16D 41/16* (2013.01)

(58) Field of Classification Search
CPC .................................................. F16D 41/125
See application file for complete search history.

(56) References Cited

U.S. PATENT DOCUMENTS

| | | | |
|---|---|---|---|
| 9,121,454 B2* | 9/2015 | Pawley | F16D 41/16 |
| 10,871,194 B2* | 12/2020 | Burke | F16D 41/04 |
| 2010/0200358 A1* | 8/2010 | Eisengruber | F16D 25/088 |
| | | | 192/41 S |
| 2017/0002877 A1* | 1/2017 | Shioiri | F16D 41/125 |
| 2021/0054886 A1* | 2/2021 | Burke | F16D 41/04 |
| 2021/0102586 A1* | 4/2021 | Hodge | F16D 41/16 |
| 2021/0164526 A1* | 6/2021 | Kimes | F16D 41/04 |

* cited by examiner

*Primary Examiner* — Timothy Hannon
(74) *Attorney, Agent, or Firm* — Davidson, Davidson & Kappel, LLC

(57) ABSTRACT

A clutch assembly is provided including a ring rotatable about a center axis defining an axial direction. The ring includes a profile facing the axial direction. The clutch assembly also includes a rocker including an engagement section that is movable in the axial direction toward and away from the profile; a strut configured for being rotated to move the engagement section of the rocker in the axial direction toward the profile; and an actuator configured to move the strut in an engagement direction to move the engagement section of the rocker in the axial direction into engagement with the profile to prevent the ring from rotating about the center axis in a first rotational direction.

20 Claims, 3 Drawing Sheets

US 11,525,489 B1

AXIAL SWITCHABLE ONE WAY CLUTCH

TECHNICAL FIELD

The present disclosure generally relates to clutch assemblies and more particularly clutch assemblies for hybrid transmission applications.

BACKGROUND

A clutch is a device used to selectively couple components such as a pair of rotating shafts or the like. A clutch may also be used to ground a rotating component to a fixed structure such as a housing. Here, the clutch is typically referred to as a brake. Clutches may be bidirectional, lock in both directions, or one-way, lock in one direction and freewheel in the other.

SUMMARY

A clutch assembly is provided including a ring rotatable about a center axis defining an axial direction. The ring includes a profile facing the axial direction. The clutch assembly also includes a rocker having an engagement section that is movable in the axial direction toward and away from the profile; a strut configured for being rotated to move the rocker in the axial direction toward the profile; and an actuator configured to move the strut in an engagement direction to move the engagement section of the rocker in the axial direction into engagement with the profile to prevent the ring from rotating about the center axis in a first rotational direction.

A method of constructing a clutch assembly is provided including inserting a ring into a housing. The ring is rotatable a first rotational direction and a second rotational direction with respect to the housing about a center axis defining an axial direction. The ring includes a profile facing the axial direction. The method includes inserting a plurality of plates, a rocker and a strut into the housing such that the rocker and strut are supported in the plates in the housing, the plates including an actuation plate; and coupling an actuator to the actuation plate, the actuator configured to rotate the actuation plate about the center axis to force the strut to move in an engagement direction, the strut being configured such that movement of the strut in the engagement direction causes an engagement section of the rocker to move in the axial direction into engagement with the profile to prevent the ring from rotating about the center axis in the first rotational direction.

A clutch assembly is also provided that includes a housing; a ring rotatable inside the housing with respect to the housing about a center axis defining an axial direction, the ring including a profile facing the axial direction; an actuation assembly inside the housing including a rocker including an engagement section that is actuatable in the axial direction; and an actuator configured to actuate the actuation assembly to move the engagement section of the rocker in the axial direction into engagement with the profile to prevent the ring from rotating about the center axis in a first rotational direction.

BRIEF DESCRIPTION OF THE DRAWINGS

The present disclosure is described below by reference to the following drawings, in which.

DETAILED DESCRIPTION

Figure 1:
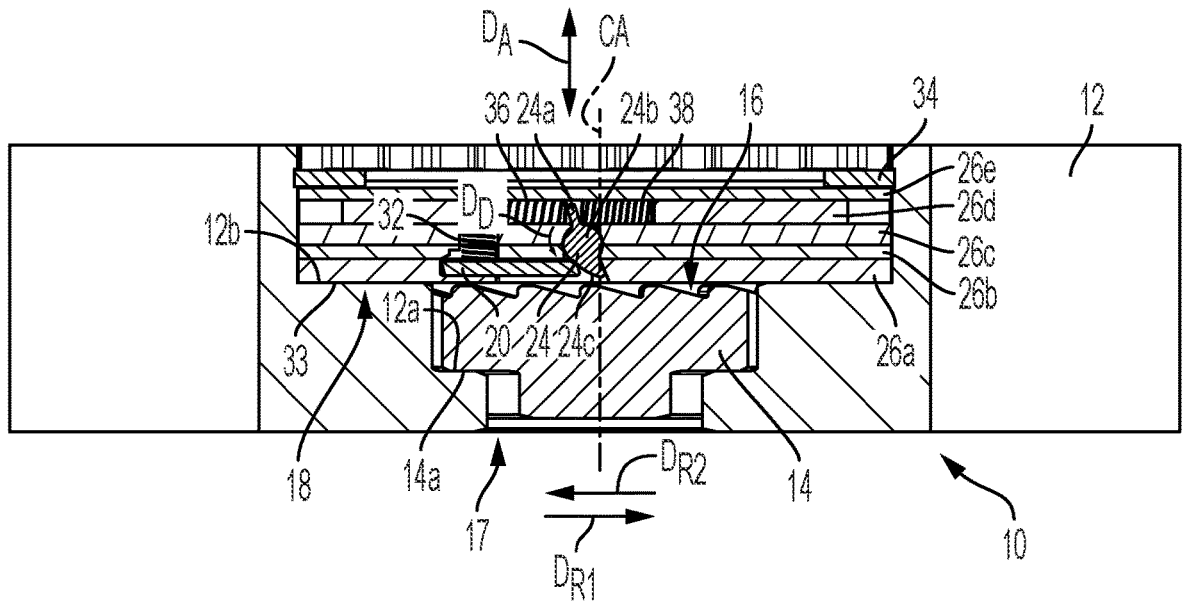
FIG. 1 shows a cross-sectional view of a clutch assembly where an actuation assembly in a deactivated configuration and thus a ring is freely rotatable about a center axis.

FIG. 1 to 4 shows a clutch assembly 10 including a housing 12 and a ring 14 rotatable inside housing 12 with respect to housing 12 about a center axis CA defining an axial direction $D_A$. Ring 14 is in the form of a cam wheel and includes a profile 16 facing axial direction $D_A$. Ring 14 has a stepped shape and includes an axially facing surface 14a contacting a first abutment surface 12a of housing 12. Clutch assembly 10 also includes an actuation assembly 18 inside housing 12 including a rocker 20 having an engagement section 20b that is actuatable in axial direction $D_A$ by pivoting the rocker 20. Housing 12 includes a stepped bore 17 therein that receives ring 14 and actuation assembly 18. Actuation assembly 18 has a greater diameter than ring 14 and thus is received in a radially larger portion of housing 12.

Figure 2:
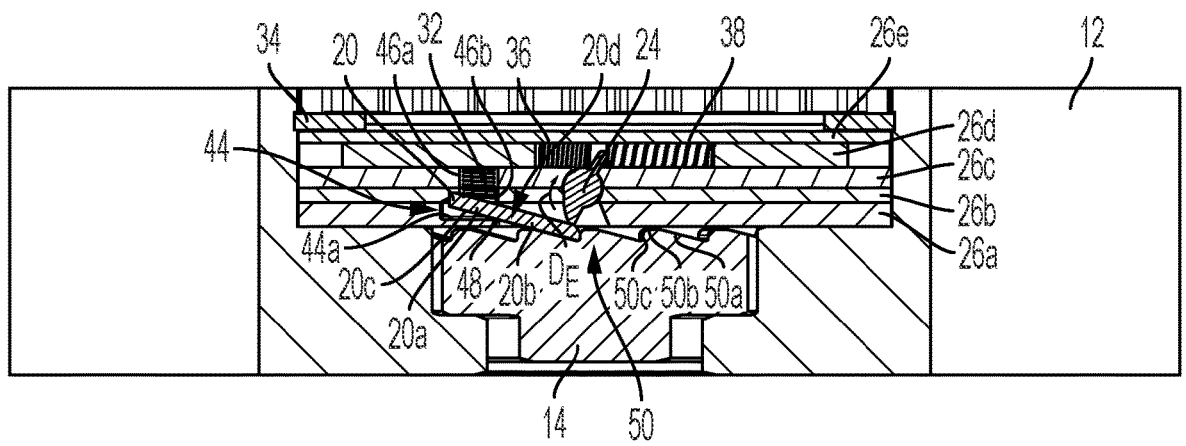
FIG. 2 shows a cross-sectional view of the clutch assembly where the actuation assembly is in an activated configuration and thus the actuation assembly blocks ring from rotating about the center axis in a first rotational direction.
Figure 3:
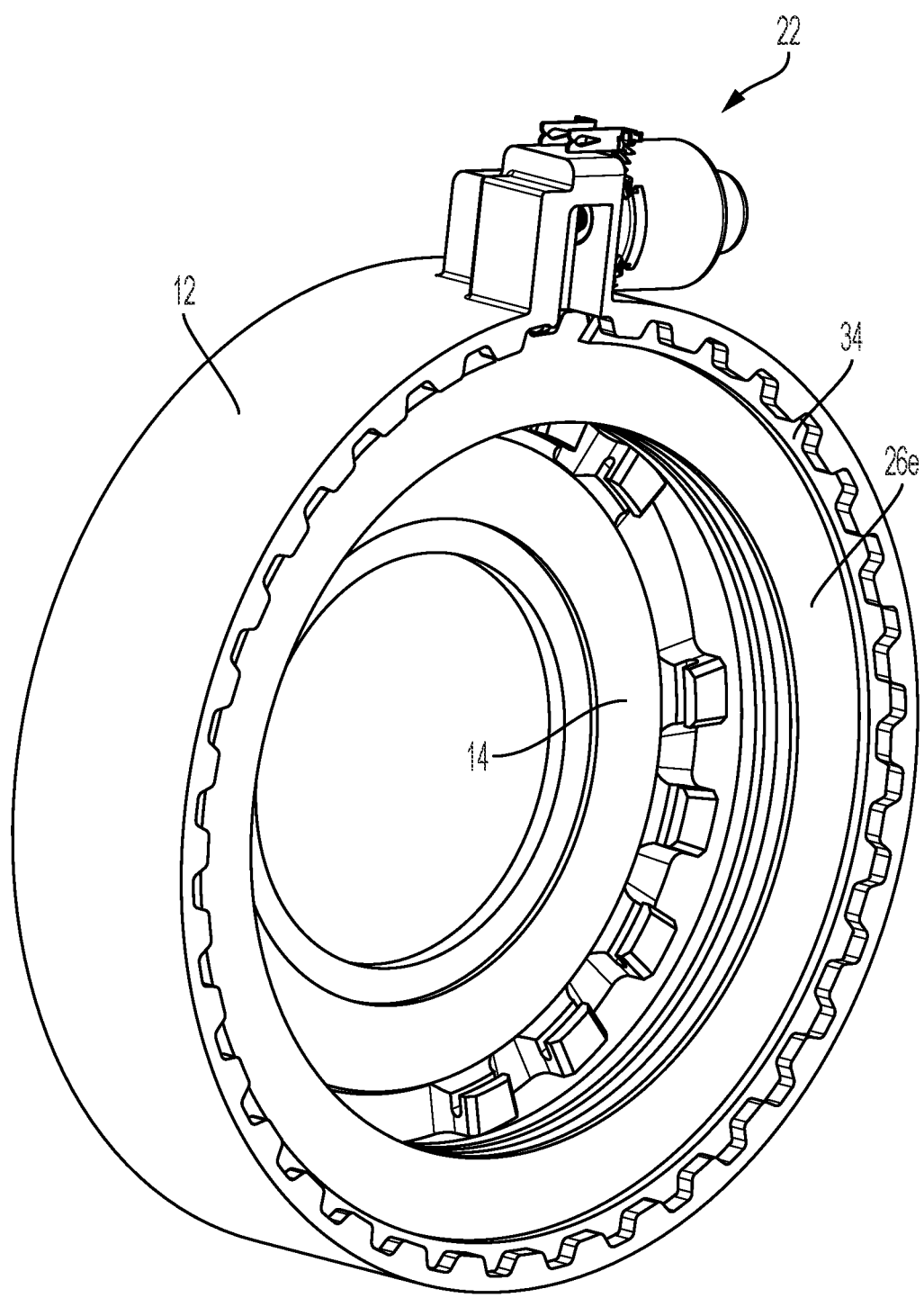
FIG. 3 shows a perspective view of the clutch assembly.
Figure 4:
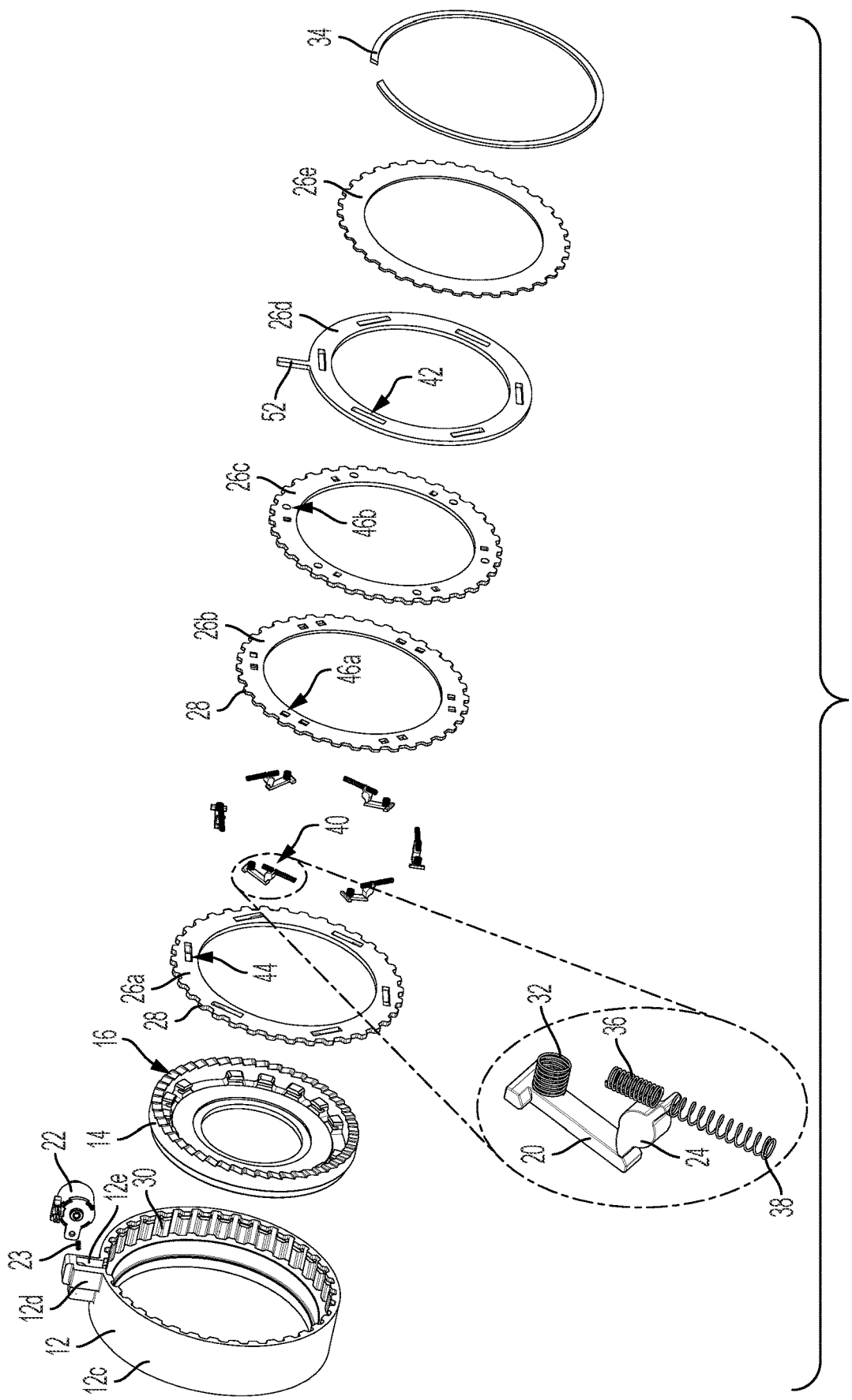
FIG. 4 shows an exploded view of the clutch assembly.

FIG. 1 shows a cross-sectional view of clutch assembly 10 where actuation assembly 18 is in a deactivated configuration and thus ring 14 is freely rotatable about center axis CA. During normal operation, ring 14 rotates in a first rotational direction $D_{R1}$, but in certain instances, ring 14 may rotate in a second rotational direction $D_{R2}$. FIG. 2 shows a cross-sectional view of actuation assembly 18 in an activated configuration and thus actuation assembly 18 blocks ring 14 from rotating about center axis CA in first rotational direction $D_{R1}$. FIG. 3 shows a perspective view of clutch assembly 10 and FIG. 4 shows an exploded view of clutch assembly 10.

Clutch assembly 10 further includes an electromechanical actuator 22 (FIGS. 3 and 4), which may include a solenoid, configured to actuate actuation assembly 18 to move the engagement surface 20b of rocker 20, via intermediate mechanisms as discussed below, in axial direction $D_A$ into engagement with profile 16 to prevent ring 14 from rotating about center axis CA in first rotational direction $D_{R1}$. Ring 14 is also prevented from rotating in second rotational direction $D_{R2}$, which is opposite of the first rotational direction $D_{R1}$, when rocker 20 is engaged with the profile 16.

Actuation assembly 18 includes a strut 24 configured for being rotated in an engagement direction $D_E$ to move engagement section 20b of rocker 20 in axial direction $D_A$ toward profile 16. Housing 12 encloses ring 14, rocker 20 and strut 24 in a radial direction defined with respect to the center axis CA. Actuation assembly 18 also includes a plurality of annular plates 26a to 26e stacked together inside of housing 12, and a snap ring 34 fixing plates 26a to 26e axially in place inside of 12. The plates include housing plates 26a to 26c fixed non-rotatably to housing 12 by teeth 28 (FIG. 4) of the housing plates 26a to 26c engaging teeth 30 (FIG. 4) of housing 12. Rocker 20 and strut 24 are receiving in housing plates 26a to 26c, as is a return spring 32 of actuation assembly 18. Return spring 32 is configured for acting on rocker 20 to force engagement section 20b of rocker 20 in axial direction $D_A$ away from profile 16. Return spring 32 is configured such that the movement of the strut

24 by the actuator 22 in the engagement direction $D_E$ overcomes the force of return spring 32 to move rocker 20 into engagement with profile 16.

The plates also include an actuation plate 26d coupled to actuator 22 such that actuator 22 can rotate actuation plate 26d about center axis CA in first rotational direction $D_{R1}$ to force strut 24 to move in engagement direction $D_E$ (FIG. 2). An actuation return spring 23 moves actuation plate 26d in second rotational direction $D_{R2}$ to force strut 24 in a disengagement direction $D_D$ (FIG. 1) to return rocker 20 into a disengaged state, moving strut 24 out of the path of rocker 20 such that return spring 32 forces rocker 20 away from profile 16. When rocker 20 is held away from the profile by return spring 32, ring 14 is free to rotate in first rotational direction $D_{R1}$.

The plates further include a cover plate 26e that axially abuts snap ring 34 to hold plates 26a to 26e axially in place in housing 12. Cover plate 26e abuts actuation plate 26d, which abuts housing plate 26c. Housing plates 26a to 26c are stacked in contact with each other and an axially facing surface 33 of the end housing plate 26a axially contacts a second abutment surface 12b of housing 12.

Actuation assembly 18 further includes a first actuation spring 36 for aiding movement of strut 24 in engagement direction $D_E$ and a second actuation spring 38 for aiding movement of strut 24 in disengagement direction $D_D$. As shown in FIG. 4, rocker 20, strut 24, return spring 32 and actuation springs 36, 38 form a transmission section 40 of actuation assembly 18, and actuation assembly 18 includes a plurality of transmission sections 40 that are circumferentially spaced apart from each other.

Referring further to FIG. 4, each set of actuation springs 36, 38 is received in a respective circumferentially extending slot 42 in actuation plate 26d and each rocker 20 is received in a respective circumferentially extending slot 44 is housing plate 26a. Return springs 32 each extend though aligned slots 46a, 46 in housing plates 26b, 26c, respectively. Struts 24 each extend axially through all of plates 26a to 26d.

Each strut 24 includes a finger 24a that is sandwiched circumferentially between actuation springs 36, 38, a body 24b that is pivotably held by plates 26b, 26c and a contact nose 24c that contacts rocker 20. Each rocker 20 is positioned to pivot about a respective internal edge 48 of housing plate 26a at pivot location 20d to move the engagement section 20b in the axial direction toward and away from profile 16. Each internal edge 48 is positioned within a respective one of slots 44. Pivot location 20d divides rocker 20 into a first section 20a that contacts return spring 32 and a second section 20b—defining the engagement section of rocker 20—that contacts nose 24c of strut 24. Return spring 32 acts to force an abutment surface 20c of first section 20a into an abutment surface 44a of the housing plate 26a in slot 44. Abutment surface 20c of rocker 20 is spaced from abutment surface 44a of housing plate 26a when rocker 20 is in engagement with profile 16.

When actuator 22 rotates actuation plate 26d in first rotational direction $D_{R1}$, actuation plate 26d compresses actuation spring 36 and actuation spring 36 increases the force exerted by spring 36 on a first side of finger 24a and rotates strut 24 in the engagement direction $D_E$. The rotation of strut 24 in engagement direction $D_E$ causes strut 24 to force second section 20b of rocker 20 into engagement with profile 16. Profile 16 includes a plurality of teeth 50 each including a tapered engagement surface 50a extending in second rotational direction $D_{R2}$, while extending toward plate 26a in the axial direction $D_A$ to a lesser extent, to join a radially extending surface 50b of profile 16. Radially extending surface 50b is the portion of profile 16 that is closest to plate 26a. Profile 16 further includes an axially extending engagement surface 50c extending away from surface 50b and plate 26a toward the surface 50a of the directly adjacent tooth 50. When rocker 20 engages profile 16, a longitudinal surface of engagement section 20b of rocker 20 rests flush against tapered engagement surface 50c and the end of engagement section 20b contacts axially extending engagement surface 50a. The contact between the end of engagement section 20b and engagement surface 50c prevents ring 14 from rotating in first rotational direction $D_{R1}$. The tapered shape of surface 50c is advantageous in that surface 50c allows clutch assembly 10 to have a transition mode. Actuator 22 is activated while ring 14 is still spinning and rocker 20 simply ratchets until rocker fully engages surface 50a and the rotational speed of ring 14 reaches zero, at which point rocker 20 locks up ring 14. If there is a change of mind event before reaching zero speed and locking up, electrical power is shut off to actuator 22 and actuation assembly 18 returns to the deactivated state like nothing ever happened.

When actuator 22 rotates actuation plate 26d in second rotational direction $D_{R2}$, actuation plate 26d compresses actuation spring 38 and actuation spring 38 increases the force exerted by spring 38 on a second side of finger 24a and rotates strut 24 in the disengagement direction $D_D$. The rotation of strut 24 in disengagement direction $D_D$ moves contact nose 24c of strut 24 away from engagement section 20b of rocker 20. When contact nose 24c comes out of contact with engagement section 20b of rocker, return spring 32 forces engagement section 20b of rocker 20 in axial direction $D_A$ away from profile 16, allowing ring 14 to be rotated in rotational direction $D_{R1}$.

As shown in FIG. 4, housing 12 has a cylindrically shaped base 12c and includes a protrusion 12d extending away from an outer circumferential surface of base 12c. Protrusion 12d is provided with a slot 12e formed therein that receives a radially extending limb 52 of actuation plate 26d. Actuator 22 is fixed to protrusion 12d of housing 12 and moves limb 52 circumferentially within slot 12e to rotate actuation plate 12d.

A method of constructing clutch assembly 12 includes inserting ring 14 into housing 12, and then inserting actuation assembly 18 into housing 12. The inserting of actuation assembly 18 includes inserting plates 26a to 26e, rocker 20 and strut 24 into the housing 12 such that rocker 20 and strut 24 are supported in plates 26a to 26d in housing 12. Actuator 22 is fixed to housing 12 and coupled to actuation plate 26d. The inserting of ring 14 into housing 12 includes axially contacting first abutment surface 12a of housing 12 with an axially facing surface 14a of ring 14, which faces away from profile 16 in axial direction $D_A$. The inserting of the plates 26a to 26e into housing 12 includes axially contacting second abutment surface 12b of housing 12 with axially facing surface 33 of the end housing plate 26a, which faces toward the ring 14 in the axial direction. The method also includes inserting return spring 32 into housing 12 such that return spring 32 is supported in plates 26a to 26c in the housing 12

The preceding specification has described specific exemplary embodiments and examples thereof. It will, however, be evident that various modifications and changes may be made thereto without departing from the broader spirit and scope set forth in the claims that follow. The specification and drawings are accordingly to be regarded in an illustrative manner rather than a restrictive sense.

LIST OF REFERENCE CHARACTERS 10 clutch assembly
12 housing
12a housing first abutment surface
12b housing second abutment surface
12c housing base
12d housing protrusion
12e housing slot
14 ring
16 profile
17 stepped bore
18 actuation assembly
20 rocker
20a rocker first section
20b rocker second section
20c rocker abutment surface
20d rocker pivot location
22 actuator
23 actuation return spring
24 strut
24a strut finger
24b strut body
24c strut contact nose
26a housing plate
26b housing plate
26c housing plate
26d actuation plate
26e cover plate
28 plate teeth
30 housing teeth
32 return spring
33 axially facing surface of the end housing plate
34 snap ring
36 first actuation spring
38 second actuation spring
40 transmission section
42 actuation spring receiving slot
44 rocker receiving slot in housing plate
44a abutment surface of housing plate
46a, 46b return spring slots
48 housing plate internal edge
50 profile teeth
50a profile tooth tapered engagement surface
50b profile tooth radially extending surface
50c profile tooth axially extending engagement surface
52 radially extending limb of actuation plate
CA center axis
DA axial direction
DR1 first rotational direction
DR2 first rotational direction
DE engagement direction

What is claimed is:

1. A clutch assembly comprising:
    a ring rotatable about a center axis defining an axial direction, the ring including a profile facing the axial direction;
    a rocker, the rocker including an engagement section movable in the axial direction toward and away from the profile;
    a strut configured for being rotated to move the engagement section of the rocker in the axial direction toward the profile; and
    an actuator configured to move the strut in an engagement direction to move the engagement section of the rocker in the axial direction into engagement with the profile to prevent the ring from rotating about the center axis in a first rotational direction.

2. The clutch assembly as recited in claim 1 wherein the rocker is configured to prevent the ring from rotating in a second rotational direction opposite of the first rotational direction when the rocker is engaged with the profile.

3. The clutch assembly as recited in claim 1 further comprising a return spring for forcing the engagement section of the rocker in the axial direction away from the profile, the return spring configured such that the movement of the strut by the actuator in the engagement direction overcomes the force of the return spring to move the rocker into engagement with the profile.

4. The clutch assembly as recited in claim 3 further comprising a housing plate, the rocker being positioned within the housing plate, the housing plate including an internal edge pivotably supporting the rocker, the rocker configured for pivoting about the internal edge to cause the engagement section of the rocker to move in the axial direction toward the profile.

5. The clutch assembly as recited in claim 4, wherein the return spring configured for forcing an abutment surface of the rocker into an abutment surface of the housing plate, the abutment surface of the rocker being spaced from the abutment surface of the housing plate when the rocker is in engagement with the profile.

6. The clutch assembly as recited in claim 1 further comprising a first actuator spring for aiding movement of the strut in the engagement direction and a second actuator spring for aiding movement of the strut in a disengagement direction opposite of the engagement direction.

7. The clutch assembly as recited in claim 1 further comprising a housing enclosing the ring, the rocker and the strut in a radial direction defined with respect to the center axis.

8. The clutch assembly as recited in claim 7 further comprising a plurality of plates stacked in the housing, the rocker and strut being supported in the plates in the housing.

9. The clutch assembly as recited in claim 8 wherein the plurality of plates includes an actuation plate rotatable by the actuator about the center axis to move the strut in the engagement direction to move the engagement section of the rocker in the axial direction into engagement with the profile.

10. The clutch assembly as recited in claim 9 wherein the actuation plate is rotatable about the center axis in the first rotational direction about the center axis to move the strut in the engagement direction, the actuation plate being rotatable about the center axis in a second rotational direction about the center axis to move the strut in a disengagement direction opposite of the engagement direction, the second rotational direction being opposite of the first rotational direction.

11. The clutch assembly as recited in claim 9 wherein the plurality of plates further include at least one housing plate fixed non-rotatably in the housing, the rocker and the strut being supported in the at least one housing plate in the housing.

12. The clutch assembly as recited in claim 8 further comprising a snap ring fixing the plates in the housing.

13. A method of constructing a clutch assembly comprising:
    inserting a ring into a housing, the ring being rotatable a first rotational direction and a second rotational direction with respect to the housing about a center axis defining an axial direction, the ring including a profile facing the axial direction;

inserting a plurality of plates, a rocker and a strut into the housing such that the rocker and strut are supported in the plates in the housing, the plates including an actuation plate; and coupling an actuator to the actuation plate, the actuator configured to rotate the actuation plate about the center axis to force the strut to move in an engagement direction, the strut being configured such that movement of the strut in the engagement direction causes an engagement section of the rocker to move in the axial direction into engagement with the profile to prevent the ring from rotating about the center axis in the first rotational direction.

14. The method as recited in claim 13 wherein the inserting of the ring into the housing includes axially contacting a first abutment surface of the housing with an axially facing surface of the ring, the axially facing surface of the ring facing away from the profile in the axial direction.

15. The method as recited in claim 14 wherein the inserting of the plates into the housing includes axially contacting a second abutment surface of the housing with an axially facing surface of one of the plates, the axially facing surface of the one of the plates facing toward the ring in the axial direction.

16. The method as recited in claim 13 further comprising inserting a return spring into the housing such that the return spring is supported in the plates in the housing, the return spring arranged for forcing the engagement section of the rocker in the axial direction away from the profile, the return spring configured such that movement of the strut in the engagement direction overcomes the force of the return spring to move the rocker into engagement with the profile.

17. A clutch assembly comprising:

a housing;

a ring rotatable inside the housing with respect to the housing about a center axis defining an axial direction, the ring including a profile facing the axial direction;

an actuation assembly inside the housing including a rocker, the rocker including an engagement section actuatable in the axial direction; and an actuator configured to actuate the actuation assembly to move the engagement section of the rocker in the axial direction into engagement with the profile to prevent the ring from rotating about the center axis in a first rotational direction.

18. The clutch assembly as recited in claim 17 wherein the actuation assembly includes a strut configured for being rotated in an engagement direction to move the engagement section of the rocker in the axial direction toward the profile.

19. The clutch assembly as recited in claim 18 wherein the actuation assembly includes an actuator plate coupled to the actuator, the actuator configured to rotate the actuation plate about the center axis to force the strut to move in the engagement direction.

20. The clutch assembly as recited in claim 18 wherein the actuation assembly includes a return spring for forcing the engagement section of the rocker in the axial direction away from the profile, the return spring configured such that the movement of the strut by the actuator in the engagement direction overcomes the force of the return spring to move the rocker into engagement with the profile.

* * * * *